(12) United States Patent
Sullivan et al.

(10) Patent No.: US 7,731,606 B2
(45) Date of Patent: *Jun. 8, 2010

(54) GOLF BALLS HAVING TWO CORE LAYERS FORMED FROM HNP COMPOSITIONS

(75) Inventors: Michael J. Sullivan, Barrington, RI (US); Derek A. Ladd, Acushnet, MA (US); Edmund A. Hebert, Mattapoisett, MA (US); Douglas E. Jones, Dartmouth, MA (US)

(73) Assignee: Acushnet Company, Fairhaven, MA (US)

( * ) Notice: Subject to any disclaimer, the term of this patent is extended or adjusted under 35 U.S.C. 154(b) by 56 days.

This patent is subject to a terminal disclaimer.

(21) Appl. No.: 12/125,284

(22) Filed: May 22, 2008

(65) Prior Publication Data

US 2008/0261723 A1    Oct. 23, 2008

Related U.S. Application Data

(63) Continuation-in-part of application No. 11/738,740, filed on Apr. 23, 2007, now Pat. No. 7,468,006, and a continuation-in-part of application No. 12/048,003, filed on Mar. 13, 2008, and a continuation-in-part of application No. 12/048,021, filed on Mar. 13, 2008.

(51) Int. Cl.
    *A63B 37/06* (2006.01)
(52) U.S. Cl. ...................................... 473/376

(58) Field of Classification Search .................. 473/376, 473/377, 373, 374
See application file for complete search history.

(56) References Cited

U.S. PATENT DOCUMENTS

2008/0227568 A1*  9/2008  Sullivan et al. ............. 473/376

* cited by examiner

*Primary Examiner*—Raeann Trimiew
(74) *Attorney, Agent, or Firm*—Mandi B. Milbank

(57) ABSTRACT

The present invention is directed to golf balls consisting of a dual-layer core and a cover. The core consists of a center having a center hardness of 50 Shore C or greater and formed from a first HNP composition, and an outer core layer having a surface hardness of 75 Shore C or greater and formed from a second HNP composition. The first HNP composition has a material hardness of 55 Shore D or less and comprises a highly neutralized ethylene/(meth)acrylic acid/alkyl (meth)acrylate copolymer. The second HNP composition has a material hardness of 45 Shore D or greater and comprises a highly neutralized ethylene/(meth)acrylic acid copolymer. The material hardness of the first HNP composition is less than the material hardness of the second HNP composition. The cover consists of an inner cover layer formed from a thermoplastic composition and an outer cover layer formed from a polyurethane or polyurea composition.

18 Claims, 1 Drawing Sheet

GOLF BALLS HAVING TWO CORE LAYERS FORMED FROM HNP COMPOSITIONS

CROSS-REFERENCE TO RELATED APPLICATIONS

This application is a continuation-in-part of U.S. patent application Ser. No. 11/738,740, filed Apr. 23, 2007 now U.S. Pat. No. 7,468,006. This application is also a continuation-in-part of U.S. patent application Ser. No. 12/048,003, filed Mar. 13, 2008. This application is also a continuation-in-part of U.S. patent application Ser. No. 12/048,021, filed Mar. 13, 2008. The entire disclosure of each of these references is hereby incorporated herein by reference.

FIELD OF THE INVENTION

The present invention is directed to golf balls comprising a core and a cover, wherein the core consists of a layer formed from a relatively soft HNP composition and a layer formed from a relatively hard HNP composition. The present invention is not limited by which core layer is formed from the soft HNP composition and which core layer is formed from the hard HNP composition, so long as both layers are present in the core of the golf ball.

BACKGROUND OF THE INVENTION

Conventional golf balls can be divided into two general classes: solid and wound. Solid golf balls include one-piece, two-piece (i.e., single layer core and single layer cover), and multi-layer (i.e., solid core of one or more layers and/or a cover of one or more layers) golf balls. Wound golf balls typically include a solid, hollow, or fluid-filled center, surrounded by a tensioned elastomeric material, and a cover.

Golf ball core and cover layers are typically constructed with polymer compositions including, for example, polybutadiene rubber, polyurethanes, polyamides, ionomers, and blends thereof. Ionomers, particularly ethylene-based ionomers, are a preferred group of polymers for golf ball layers because of their toughness, durability, and wide range of hardness values.

Golf ball compositions comprising highly neutralized acid polymers are known. For example, U.S. Patent Application Publication No. 2003/0130434, the entire disclosure of which is hereby incorporated herein by reference, discloses melt-processable, highly-neutralized ethylene acid copolymers and process for making them by incorporating an aliphatic, mono-functional organic acid in the acid copolymer and then neutralizing greater than 90% of all the acid groups present. The use of such compositions in various golf ball layers is disclosed. Also, U.S. Patent Application Publication No. 2005/0148725, the entire disclosure of which is hereby incorporated herein by reference, discloses a highly-resilient thermoplastic composition comprising (a) an acid copolymer, (b) a salt of a high molecular weight, monomeric organic acid; (c) a thermoplastic resin; (d) a cation source; and (e) optionally, a filler. The reference also discloses one-piece, two-piece, three-piece, and multi-layered golf balls comprising the highly-resilient thermoplastic composition.

While various uses for highly neutralized acid polymers in golf balls have been discovered, there is a need in the industry to broaden the applicability of highly neutralized acid polymers to particular golf ball constructions having desirable spin, feel, and COR properties. The present invention provides such golf ball constructions through the use of a layer formed from a relatively soft HNP composition and a layer formed from a relatively hard HNP composition.

SUMMARY OF THE INVENTION

In one embodiment, the present invention is directed to a golf ball consisting of a center, an outer core layer, an inner cover layer, and an outer cover layer. The center has a diameter of from 1.20 inches to 1.30 inches, a center hardness of 50 Shore C or greater, and is formed from a first HNP composition. The first HNP composition has a material hardness of 55 Shore D or less and comprises a highly neutralized ethylene/(meth)acrylic acid/alkyl (meth)acrylate copolymer. The outer core layer has a surface hardness of 75 Shore C or greater and is formed from a second HNP composition. The second HNP composition has a material hardness of 45 Shore D or greater and comprises a highly neutralized ethylene/(meth)acrylic acid copolymer. The Shore D hardness of the first HNP composition is less than the Shore D hardness of the second HNP composition. The inner cover layer is formed from a thermoplastic composition and has a material hardness less than the surface hardness of the outer core layer. The outer cover layer is formed from a polyurethane or polyurea composition.

In one embodiment, the present invention is directed to a golf ball consisting of a center, an outer core layer, an inner cover layer, and an outer cover layer. The center has a diameter of from 0.75 inches to 1.19 inches, a center hardness of 50 Shore C or greater, and is formed from a first HNP composition. The first HNP composition has a material hardness of 55 Shore D or less and comprises a highly neutralized ethylene/(meth)acrylic acid/alkyl (meth)acrylate copolymer. The outer core layer has a surface hardness of 75 Shore C or greater and is formed from a second HNP composition. The second HNP composition has a material hardness of 45 Shore D or greater and comprises a highly neutralized ethylene/(meth)acrylic acid copolymer. The Shore D hardness of the first HNP composition is less than the Shore D hardness of the second HNP composition. The inner cover layer is formed from a thermoplastic composition and has a material hardness less than the surface hardness of the outer core layer. The outer cover layer is formed from a polyurethane or polyurea composition.

DETAILED DESCRIPTION OF THE INVENTION

Figure 1:
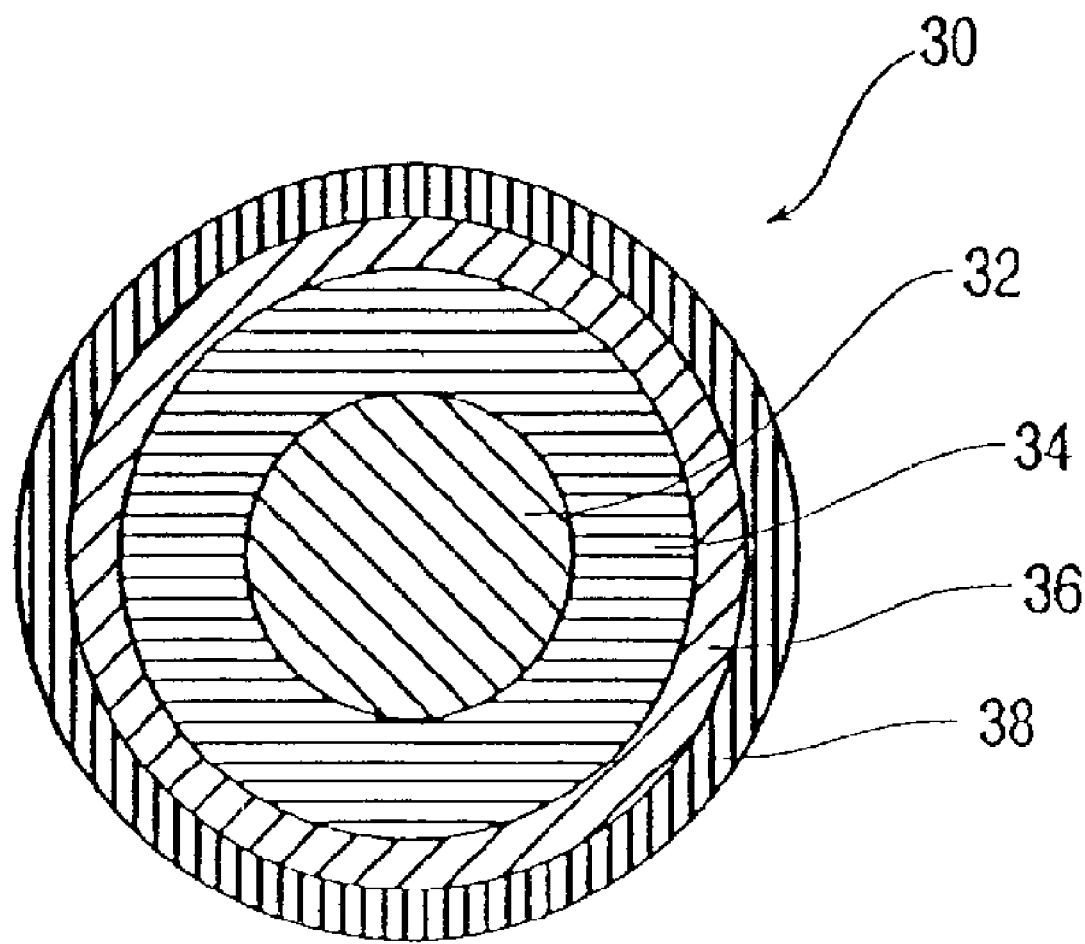
FIG. 1 is a cross-sectional view of a golf ball according to one embodiment of the present invention.

FIG. 1 shows a golf ball 30 according to one embodiment of the present invention, including a center 32, an outer core layer 34, an inner cover layer 36, and an outer cover layer 38. While shown in FIG. 1 as a dual-layer cover, the cover may be a single-, dual-, or multi-layer cover.

Golf balls of the present invention have at least two layers formed from highly neutralized acid polymer ("HNP") compositions. More particularly, golf balls of the present invention have at least one layer formed from a relatively soft HNP composition, and at least one layer formed from a relatively hard HNP composition.

As used herein, "highly neutralized acid polymer" refers to an acid polymer after at least 80%, preferably at least 90%, more preferably at least 95%, and even more preferably 100%, of the acid groups of the acid polymer are neutralized.

As used herein, "modulus" refers to flexural modulus as measured using a standard flex bar according to ASTM D790-B.

For purposes of the present disclosure, material hardness is measured according to ASTM D2240 and generally involves measuring the hardness of a flat "slab" or "button" formed of the material. It should be understood that there is a fundamental difference between "material hardness" and "hardness as measured directly on a golf ball." Hardness as measured directly on a golf ball (or other spherical surface) typically results in a different hardness value than material hardness. This difference in hardness values is due to several factors including, but not limited to, ball construction (i.e., core type, number of core and/or cover layers, etc.), ball (or sphere) diameter, and the material composition of adjacent layers. It should also be understood that the two measurement techniques are not linearly related and, therefore, one hardness value cannot easily be correlated to the other. Unless stated otherwise, the hardness values given herein for cover materials are material hardness values measured according to ASTM D2240, with all values reported following 10 days of aging at 50% relative humidity and 23° C.

The surface hardness of a golf ball layer is obtained from the average of a number of measurements taken from opposing hemispheres of a core, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface of a core, care must be taken to insure that the golf ball or golf ball subassembly is centered under the durometer indentor before a surface hardness reading is obtained. A calibrated, digital durometer, capable of reading to 0.1 hardness units is used for all hardness measurements and is set to take hardness readings at 1 second after the maximum reading is obtained. The digital durometer must be attached to, and its foot made parallel to, the base of an automatic stand, such that the weight on the durometer and attack rate conform to ASTM D-2240.

The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut, made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height of the bottom of the holder to the exposed surface of the core, making sure that exactly half of the original height of the core, as measured above, has been removed to within ±0.004 inches. Leaving the core in the holder, the center of the core is found with a center square and carefully marked and the hardness is measured at the center mark.

Golf ball cores of the present invention may have a zero or negative or positive hardness gradient. A hardness gradient is defined by hardness measurements made at the surface of the layer (e.g., center, outer core layer, etc.) and radially inward towards the center of the ball, typically at 2 mm increments. For purposes of the present invention, "negative" and "positive" refer to the result of subtracting the hardness value at the innermost portion of the golf ball component from the hardness value at the outer surface of the component. For example, if the outer surface of a solid core has a lower hardness value than the center (i.e., the surface is softer than the center), the hardness gradient will be deemed a "negative" gradient. In measuring the hardness gradient of a core, the center hardness is first determined according to the procedure above for obtaining the center hardness of a core. Once the center of the core is marked and the hardness thereof is determined, hardness measurements at any distance from the center of the core may be measured by drawing a line radially outward from the center mark, and measuring and marking the distance from the center, typically in 2 mm increments. All hardness measurements performed on a plane passing through the geometric center are performed while the core is still in the holder and without having disturbed its orientation, such that the test surface is constantly parallel to the bottom of the holder. The hardness difference from any predetermined location on the core is calculated as the average surface hardness minus the hardness at the appropriate reference point, e.g., at the center of the core for a single, solid core, such that a core surface softer than its center will have a negative hardness gradient. Hardness gradients are disclosed more fully, for example, in U.S. patent application Ser. Nos. 11/832,163, filed on Aug. 1, 2007; 11/939,632, filed on Nov. 14, 2007; 11/939,634, filed on Nov. 14, 2007; 11/939,635, filed on Nov. 14, 2007; and 11/939,637, filed on Nov. 14, 2007; the entire disclosure of each of these references is hereby incorporated herein by reference.

Relatively Soft HNP Composition

Relatively soft HNP compositions of the present invention have a material hardness of 80 Shore D or less, and preferably have a Shore D hardness of 55 or less or a Shore D hardness within the range having a lower limit of 10 or 20 or 30 or 37 or 39 or 40 or 45 and an upper limit of 48 or 50 or 52 or 55 or 60 or 80.

Relatively soft HNP compositions of the present invention comprise at least one highly neutralized acid polymer. In a preferred embodiment, the highly neutralized acid polymer of the relatively soft HNP composition is a low modulus HNP having a modulus within a range having a lower limit of 1,000 or 5,000 or 10,000 psi and an upper limit of 17,000 or 25,000 or 28,000 or 30,000 or 35,000 or 45,000 or 50,000 or 55,000 psi. In a particular aspect of this embodiment, the modulus of the low modulus HNP is at least 10% less, or at least 20% less, or at least 25% less, or at least 30% less, or at least 35% less, than that of the high modulus HNP discussed below.

HNPs of the relatively soft HNP compositions of the present invention are salts of acid copolymers. It is understood that the HNP may be a blend of two or more HNPs. The acid copolymer of the HNP is an O/X/Y-type copolymer, wherein O is an α-olefin, X is a $C_3$-$C_8$ α,β-ethylenically unsaturated carboxylic acid, and Y is a softening monomer. O is preferably ethylene. X is preferably selected from (meth) acrylic acid, ethacrylic acid, maleic acid, crotonic acid, fumaric acid, and itaconic acid. (Meth) acrylic acid is particularly preferred. As used herein, "(meth) acrylic acid" means methacrylic acid and/or acrylic acid. Likewise, "(meth) acrylate" means methacrylate and/or acrylate. Y is preferably an alkyl (meth)acrylate, wherein the alkyl groups have from 1 to 8 carbon atoms. Preferred O/X/Y-type copolymers are those wherein O is ethylene, X is (meth) acrylic acid, and Y is selected from (meth)acrylate, n-butyl(meth)acrylate, isobutyl (meth)acrylate, methyl (meth)acrylate, and ethyl(meth)acrylate. Particularly preferred O/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The acid copolymer of the HNP typically includes the α-olefin in an amount of at least 15 wt %, or at least 25 wt %, or at least 40 wt %, or at least 60 wt %, based on the total weight of the acid copolymer. The amount of $C_3$-$C_8$ α,β-ethylenically unsaturated carboxylic acid in the acid copolymer is typically within a range having a lower limit of 1 or 4 or 6 or 8 or 10 or 15 wt % and an upper limit of 20 or 35 or 40 wt %, based on the total weight of the acid copolymer. The amount of softening monomer in the acid copolymer is typically within a range having a lower limit of 1 or 3 or 5 or 11 or 15 or 20 wt % and an upper limit of 23 or 25 or 30 or 35 or 50 wt %, based on the total weight of the acid copolymer.

Particularly suitable acid copolymers of the HNP of the relatively soft HNP composition include very low modulus ionomer- ("VLMI-") type ethylene-acid polymers, such as Surlyn® 6320, Surlyn® 8120, Surlyn® 8320, and Surlyn® 9320. Surlyn® ionomers are commercially available from E. I. du Pont de Nemours and Company. Also suitable are DuPont® HPF 1000 and DuPont® HPF 2000, ionomeric materials commercially available from E. I. du Pont de Nemours and Company.

Additional suitable acid copolymers are disclosed, for example, in U.S. Patent Application Publication Nos. 2005/0148725, 2005/0020741, 2004/0220343, and 2003/0130434, and U.S. Pat. Nos. 5,691,418, 6,562,906, 6,653,382, 6,777,472, 6,762,246, and 6,815,480, the entire disclosures of which are hereby incorporated herein by reference.

In a preferred embodiment, the HNP of the relatively soft HNP composition is formed by reacting an acid copolymer, which is optionally partially neutralized, with a sufficient amount of cation source, in the presence of a high molecular weight organic acid or salt thereof, such that at least 80%, preferably at least 90%, more preferably at least 95%, and even more preferably 100%, of all acid groups present are neutralized. The acid copolymer can be reacted with the high molecular weight organic acid or salt thereof and the cation source simultaneously, or the acid copolymer can be reacted with the high molecular weight organic acid prior to the addition of the cation source.

Suitable high molecular weight organic acids are aliphatic organic acids, aromatic organic acids, saturated monofunctional organic acids, unsaturated monofunctional organic acids, multi-unsaturated monofunctional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof, and combinations thereof. Salts of high molecular weight organic acids comprise the salts, particularly the barium, lithium, sodium, zinc, bismuth, chromium, cobalt, copper, potassium, stontium, titanium, tungsten, magnesium, and calcium salts, of aliphatic organic acids, aromatic organic acids, saturated monofunctional organic acids, unsaturated monofunctional organic acids, multi-unsaturated monofunctional organic acids, dimerized derivatives thereof, and combinations thereof. Suitable organic acids and salts thereof are more fully described, for example, in U.S. Pat. No. 6,756,436, the entire disclosure of which is hereby incorporated herein by reference.

Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. The acid copolymer may be at least partially neutralized prior to contacting the acid copolymer with the cation source to form the HNP. Methods of preparing ionomers are well known, and are disclosed, for example, in U.S. Pat. No. 3,264,272, the entire disclosure of which is hereby incorporated herein by reference. The acid copolymer can be a direct copolymer wherein the polymer is polymerized by adding all monomers simultaneously, as disclosed, for example, in U.S. Pat. No. 4,351,931, the entire disclosure of which is hereby incorporated herein by reference. Alternatively, the acid copolymer can be a graft copolymer wherein a monomer is grafted onto an existing polymer, as disclosed, for example, in U.S. Patent Application Publication No. 2002/0013413, the entire disclosure of which is hereby incorporated herein by reference.

Relatively soft HNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. Suitable organic acids are more fully described, for example, in U.S. Pat. No. 6,756,436, the entire disclosure of which is hereby incorporated herein by reference.

Additional melt flow modifiers suitable for use in compositions of the present invention, include the non-fatty acid melt flow modifiers described in copending U.S. patent application Ser. Nos. 11/216,725 and 11/216,726, the entire disclosures of which are hereby incorporated herein by reference.

Relatively soft HNP compositions of the present invention optionally include additive(s) and/or filler(s) in an amount of 50 wt % or less, or 30 wt % or less, or 15 wt % or less, based on the total weight of the relatively soft HNP composition. Suitable additives and fillers include, but are not limited to, chemical blowing and foaming agents, optical brighteners, coloring agents, fluorescent agents, whitening agents, UV absorbers, light stabilizers, defoaming agents, processing aids, mica, talc, nano-fillers, antioxidants, stabilizers, softening agents, fragrance components, plasticizers, impact modifiers, $TiO_2$, acid copolymer wax, surfactants, and fillers, such as zinc oxide, tin oxide, barium sulfate, zinc sulfate, calcium oxide, calcium carbonate, zinc carbonate, barium carbonate, clay, tungsten, tungsten carbide, silica, lead silicate, regrind (recycled material), and mixtures thereof. Suitable additives are more fully described in, for example, U.S. Patent Application Publication No. 2003/0225197, the entire disclosure of which is hereby incorporated herein by reference.

Relatively soft HNP compositions of the present invention optionally contain a high modulus HNP.

In a particular embodiment, the relatively soft HNP composition has a moisture vapor transmission rate of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$ day or less), or less than 1 g-mil/100 in$^2$/day (i.e., less than 0.4 g-mm/m$^2$·day). As used herein, moisture vapor transmission rate ("MVTR") is given in g-mil/100 in$^2$/day, and is measured at 20° C. and according to ASTM F1249-99. In a preferred aspect of this embodiment, the relatively soft HNP composition comprises a low modulus HNP prepared using a cation source which is less hydrophilic than conventional magnesium-based cation sources. Suitable moisture resistant HNP compositions are disclosed, for example, in U.S. Patent Application Publication Nos. 2005/0267240, 2006/0106175 and 2006/0293464, the entire disclosures of which are hereby incorporated herein by reference.

In another particular embodiment, a sphere formed from the relatively soft HNP composition has a compression of 80 or less, or 70 or less, or 65 or less, or 60 or less, or 50 or less, or 40 or less, or 30 or less, or 20 or less.

Relatively soft HNP compositions of the present invention are not limited by any particular method or any particular equipment for making the compositions. In a preferred embodiment, the composition is prepared by the following process. The acid polymer(s), preferably a VLMI-type ethylene-acid terpolymer, high molecular weight organic acid(s) or salt(s) thereof, and optionally additive(s)/filler(s) are simultaneously or individually fed into a melt extruder, such as a single or twin screw extruder. A suitable amount of cation source is simultaneously or subsequently added such that at least 80%, preferably at least 90%, more preferably at least 95%, and even more preferably 100%, of all acid groups present are neutralized. The acid polymer may be at least partially neutralized prior to the above process. The components are intensively mixed prior to being extruded as a strand from the die-head.

Relatively soft HNP compositions of the present invention may be blended with one or more additional polymers, such as thermoplastic polymers and elastomers. Examples of thermoplastic polymers suitable for blending include, but are not limited to, bimodal ionomers (e.g., as disclosed in U.S. Patent Application Publication No. 2004/0220343 and U.S. Pat. Nos. 6,562,906, 6,762,246 and 7,273,903, the entire disclosures of which are hereby incorporated herein by reference), ionomers modified with rosins (e.g., as disclosed in U.S. Patent Application Publication No. 2005/0020741, the entire disclosure of which is hereby incorporated by reference), soft and resilient ethylene copolymers (e.g., as disclosed U.S. Patent Application Publication No. 2003/0114565, the entire disclosure of which is hereby incorporated herein by reference) polyolefins, polyamides, polyesters, polyethers, polycarbonates, polysulfones, polyacetals, polylactones, acrylonitrile-butadiene-styrene resins, polyphenylene oxide, polyphenylene sulfide, styrene-acrylonitrile resins, styrene maleic anhydride, polyimides, aromatic polyketones, ionomers and ionomeric precursors, acid copolymers, conventional HNPs, polyurethanes, grafted and non-grafted metallocene-catalyzed polymers, single-site catalyst polymerized polymers, high crystalline acid polymers, cationic ionomers, and combinations thereof. Particular polyolefins suitable for blending include one or more, linear, branched, or cyclic, $C_2$-$C_{40}$ olefins, particularly polymers comprising ethylene or propylene copolymerized with one or more $C_2$-$C_{40}$ olefins, $C_3$-$C_{20}$ α-olefins, or $C_3$-$C_{10}$ α-olefins. Particular conventional HNPs suitable for blending include, but are not limited to, one or more of the HNPs disclosed in U.S. Pat. Nos. 6,756,436, 6,894,098, and 6,953,820, the entire disclosures of which are hereby incorporated herein by reference. Examples of elastomers suitable for blending with the invention polymers include natural and synthetic rubbers, including, but not limited to, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, natural rubber, polyisoprene, copolymers of butadiene with acrylonitrile, polychloroprene, alkyl acrylate rubber, chlorinated isoprene rubber, acrylonitrile chlorinated isoprene rubber, and polybutadiene rubber (cis and trans). Additional suitable blend polymers include those described in U.S. Pat. No. 5,981,658, for example at column 14, lines 30 to 56, the entire disclosure of which is hereby incorporated herein by reference. The blends described herein may be produced by post-reactor blending, by connecting reactors in series to make reactor blends, or by using more than one catalyst in the same reactor to produce multiple species of polymer. The polymers may be mixed prior to being put into an extruder, or they may be mixed in an extruder.

Particularly suitable relatively soft HNP compositions include, but are not limited to, the highly-resilient thermoplastic compositions disclosed in U.S. Patent Application Publication No. 2005/0148725; the highly-neutralized ethylene copolymers disclosed in U.S. Pat. Nos. 6,653,382 and 6,777,472, and U.S. Patent Application Publication No. 2003/0130434; and the highly-resilient thermoplastic elastomer compositions disclosed in U.S. Pat. No. 6,815,480; the entire disclosures of which are hereby incorporated herein by reference.

Relatively Hard HNP Composition

Relatively hard HNP compositions of the present invention have a Shore D hardness of 35 or greater, and preferably have a Shore D hardness of 45 or greater or a Shore D hardness with the range having a lower limit of 45 or 50 or 55 or 57 or 58 or 60 or 65 or 70 or 75 and an upper limit of 80 or 85 or 90 or 95.

Relatively hard HNP compositions of the present invention comprise at least one highly neutralized acid polymer. In a preferred embodiment, the highly neutralized acid polymer of the relatively hard HNP composition is a high modulus HNP having a modulus within a range having a lower limit of 25,000 or 27,000 or 30,000 or 40,000 or 45,000 or 50,000 or 55,000 or 60,000 psi and an upper limit of 72,000 or 75,000 or 100,000 or 150,000 psi.

HNPs of the relatively hard HNP compositions of the present invention are salts of acid copolymers. It is understood that the HNP may be a blend of two or more HNPs. Preferred acid copolymers are copolymers of an α-olefin and a $C_3$-$C_8$ α,β-ethylenically unsaturated carboxylic acid. The acid is typically present in the acid copolymer in an amount within a range having a lower limit of 1 or 10 or 12 or 15 or 20 wt % and an upper limit of 25 or 30 or 35 or 40 wt %, based on the total weight of the acid copolymer. The α-olefin is preferably selected from ethylene and propylene. The acid is preferably selected from (meth) acrylic acid, ethacrylic acid, maleic acid, crotonic acid, fumaric acid, and itaconic acid. (Meth)acrylic acid is particularly preferred. In a preferred embodiment, the HNP of the relatively hard HNP composition has a higher level of acid than the HNP of the relatively soft HNP composition.

Suitable acid copolymers include partially neutralized acid polymers. Examples of suitable partially neutralized acid polymers include, but are not limited to, Surlyn® ionomers, commercially available from E. I. du Pont de Nemours and Company; AClyn® ionomers, commercially available from Honeywell International Inc.; and Iotek® ionomers, commercially available from ExxonMobil Chemical Company. Also suitable are DuPont® HPF 1000 and DuPont® HPF 2000, ionomeric materials commercially available from E. I. du Pont de Nemours and Company. Additional suitable acid polymers are more fully described, for example, in U.S. Pat. Nos. 6,562,906, 6,762,246, and 6,953,820 and U.S. Patent Application Publication Nos. 2005/0049367, 2005/0020741, and 2004/0220343, the entire disclosures of which are hereby incorporated herein by reference.

In a preferred embodiment, the HNP of the relatively soft HNP composition is formed by reacting an acid copolymer with a sufficient amount of cation source such that at least 80%, preferably at least 90%, more preferably at least 95%, and even more preferably 100%, of all acid groups present are neutralized. Suitable cation sources include metal ions and compounds of alkali metals, alkaline earth metals, and transition metals; metal ions and compounds of rare earth elements; silicone, silane, and silicate derivatives and complex ligands; and combinations thereof. Preferred cation sources are metal ions and compounds of magnesium, sodium, potassium, cesium, calcium, barium, manganese, copper, zinc, tin, lithium, and rare earth metals. Metal ions and compounds of calcium and magnesium are particularly preferred. The acid copolymer may be at least partially neutralized prior to contacting the acid copolymer with the cation source to form the HNP. As previously stated, methods of preparing ionomers, and the acid copolymers on which ionomers are based, are disclosed, for example, in U.S. Pat. Nos. 3,264,272, and 4,351,931, and U.S. Patent Application Publication No. 2002/0013413.

Relatively hard HNP compositions of the present invention optionally contain one or more melt flow modifiers. The amount of melt flow modifier in the composition is readily determined such that the melt flow index of the composition is at least 0.1 g/10 min, preferably from 0.5 g/10 min to 10.0 g/10 min, and more preferably from 1.0 g/10 min to 6.0 g/10 min, as measured using ASTM D-1238, condition E, at 190° C., using a 2160 gram weight.

Suitable melt flow modifiers include, but are not limited to, high molecular weight organic acids and salts thereof, polyamides, polyesters, polyacrylates, polyurethanes, polyethers, polyureas, polyhydric alcohols, and combinations thereof. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, dimerized derivatives thereof. Suitable organic acids are more fully described, for example, in U.S. Pat. No. 6,756,436, the entire disclosure of which is hereby incorporated herein by reference.

Additional melt flow modifiers suitable for use in compositions of the present invention, include the non-fatty acid melt flow modifiers described in copending U.S. patent application Ser. Nos. 11/216,725 and 11/216,726, the entire disclosures of which are hereby incorporated herein by reference.

Relatively hard HNP compositions of the present invention optionally include additive(s) and/or filler(s) in an amount within a range having a lower limit of 0 or 5 or 10 wt %, and an upper limit of 25 or 30 or 50 wt %, based on the total weight of the relatively hard HNP composition. Suitable additives and fillers include those previously described as suitable for the relatively soft HNP compositions of the present invention.

Relatively hard HNP compositions of the present invention optionally contain a low modulus HNP.

In a particular embodiment, the relatively hard HNP composition has an MVTR of 8 g-mil/100 in$^2$/day or less (i.e., 3.2 g-mm/m$^2$·day or less), or 5 g-mil/100 in$^2$/day or less (i.e., 2.0 g-mm/m$^2$·day or less), or 3 g-mil/100 in$^2$/day or less (i.e., 1.2 g-mm/m$^2$·day or less), or 2 g-mil/100 in$^2$/day or less (i.e., 0.8 g-mm/m$^2$·day or less), or 1 g-mil/100 in$^2$/day or less (i.e., 0.4 g-mm/m$^2$·day or less), or less than 1 g-mil/100 in$^2$/day (i.e., less than 0.4 g-mm/m$^2$·day). In a preferred aspect of this embodiment, the relatively hard HNP composition comprises a high modulus HNP prepared using a cation source which is less hydrophilic than conventional magnesium-based cation sources. Suitable moisture resistant HNP compositions are disclosed, for example, in copending U.S. patent application Ser. No. 11/270,066 and U.S. Patent Application Publication No. 2005/0267240, the entire disclosures of which are hereby incorporated herein by reference.

In another particular embodiment, a sphere formed from the relatively hard HNP composition has a compression of 70 or greater, or 80 or greater, or a compression within a range having a lower limit of 70 or 80 or 90 or 100 and an upper limit of 110 or 130 or 140.

Relatively hard HNP compositions of the present invention are not limited by any particular method or any particular equipment for making the compositions. In a preferred embodiment, the composition is prepared by the following process. The acid polymer(s), preferably an ethylene/(meth) acrylic acid copolymer, optional melt flow modifier(s), and optional additive(s)/filler(s) are simultaneously or individually fed into a melt extruder, such as a single or twin screw extruder. A suitable amount of cation source is then added such that at least 80%, preferably at least 90%, more preferably at least 95%, and even more preferably 100%, of all acid groups present are neutralized. The acid polymer may be at least partially neutralized prior to the above process. The components are intensively mixed prior to being extruded as a strand from the die-head.

In another preferred embodiment, the relatively hard HNP composition is formed by combining a low modulus HNP with a sufficient amount of one or more additional material(s), including, but not limited to, additives, fillers, and polymeric materials, to increase the modulus such that the resulting composition has a modulus as described above for the high modulus HNP.

Relatively hard HNP compositions of the present invention may be blended with one or more additional polymers, such as thermoplastic polymers and elastomers. Examples of thermoplastic polymers and elastomers suitable for blending include those previously described as suitable for blending with the relatively soft HNP compositions of the present invention.

HNP compositions of the present invention, in the neat (i.e., unfilled) form, preferably have a specific gravity of from 0.95 g/cc to 0.99 g/cc. Any suitable filler, flake, fiber, particle, or the like, of an organic or inorganic material may be added to the HNP composition to increase or decrease the specific gravity, particularly to adjust the weight distribution within the golf ball, as further disclosed in U.S. Pat. Nos. 6,494,795, 6,547,677, 6,743,123, 7,074,137, and 6,688,991, the entire disclosures of which are hereby incorporated herein by reference.

Golf Ball Applications

Golf balls of the present invention comprise at least one layer formed from a relatively soft HNP composition and at least one layer formed from a relatively hard HNP composition. In a preferred embodiment, the present invention provides a golf ball having a dual-layer core and a dual-layer cover, wherein the dual-layer core includes a layer formed from a relatively soft HNP composition and a layer formed from a relatively hard HNP composition.

In the embodiments disclosed herein, the relatively soft HNP composition and/or the relatively hard HNP composition can be either foamed or filled with density adjusting materials to provide desirable golf ball performance characteristics.

Golf balls having a layer formed from a relatively soft HNP composition and a layer formed from a relatively hard HNP composition are further disclosed, for example, in U.S. Patent Application Publication No. 2007/0207879, the entire disclosure of which is hereby incorporated herein by reference.

In one embodiment, the present invention provides a golf ball having a dual-layer core, wherein the core includes a center and an outer core layer. In a particular aspect of this embodiment, the center is formed from a relatively soft HNP composition and the outer core layer is formed from a relatively hard HNP composition. In another particular aspect of this embodiment, the center is formed from a relatively hard HNP composition and the outer core layer is formed from a relatively soft HNP composition.

In one embodiment, the present invention is directed to a golf ball comprising a center, an outer core layer, and one or more cover layers. In a particular aspect of this embodiment, the golf ball has one or more of the following properties:

(a) a center having a diameter within a range having a lower limit of 0.500 or 0.750 or 1.000 or 1.100 or 1.200 inches and an upper limit of 1.300 or 1.350 or 1.400 or 1.550 or 1.570 or 1.580 inches;

(b) a center having a diameter within a range having a lower limit of 0.750 or 0.850 or 0.875 inches and an upper limit of 1.125 or 1.150 or 1.190 inches;

(c) an outer core layer enclosing the center such that the dual-layer core has an overall diameter within a range having a lower limit of 1.400 or 1.500 or 1.510 or 1.520 or 1.525 inches and an upper limit of 1.540 or 1.550 or 1.555 or 1.560 or 1.590 inches, or an outer core layer having a thickness within a range having a lower limit of 0.020 or 0.025 or 0.032 inches and an upper limit of 0.310 or 0.440 or 0.560 inches;

(d) a center having a center hardness of 50 Shore C or greater, or 55 Shore C or greater, or 60 Shore C or greater, or a center hardness within a range having a lower limit of 50 or 55 or 60 Shore C and an upper limit of 65 or 70 or 80 Shore C;

(e) a center having a surface hardness of 65 Shore C or greater, or 70 Shore C or greater, or a surface hardness within a range having a lower limit of 55 or 60 or 65 or 70 or 75 Shore C and an upper limit of 80 or 85 Shore C;

(f) an outer core layer having a surface hardness of 75 Shore C or greater, or 80 Shore C or greater, or greater than 80 Shore C, or 85 Shore C or greater, or greater than 85 Shore C, or 87 Shore C or greater, or greater than 87 Shore C, or 89 Shore C or greater, or greater than 89 Shore C, or 90 Shore C or greater, or greater than 90 Shore C, or a surface hardness within a range having a lower limit of 75 or 80 or 85 Shore C and an upper limit of 95 Shore C;

(g) a center having a surface hardness greater than or equal to the center hardness of the center;

(h) a center having a positive hardness gradient wherein the surface hardness of the center is at least 10 Shore C units greater than the center hardness of the center;

(i) an outer core layer having a surface hardness greater than or equal to the surface hardness and center hardness of the center;

(j) a core having a positive hardness gradient wherein the surface hardness of the outer core layer is at least 20 Shore C units greater, or at least 25 Shore C units greater, or at least 30 Shore C units greater, than the center hardness of the center;

(k) a center having a compression of 40 or less; and (l) a center having a compression of from 20 to 40.

The weight distribution of cores disclosed herein can be varied to achieve certain desired parameters, such as spin rate, compression, and initial velocity.

Golf ball cores of the present invention typically have an overall core compression of less than 100, or a compression of 87 or less, or an overall core compression within a range having a lower limit of 20 or 50 or 60 or 65 or 70 or 75 and an upper limit of 80 or 85 or 90 or 100 or 110 or 120, or an overall core compression of about 80. Compression is an important factor in golf ball design. For example, the compression of the core can affect the ball's spin rate off the driver and the feel. As disclosed in Jeff Dalton's *Compression by Any Other Name, Science and Golf IV, Proceedings of the World Scientific Congress of Golf* (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, "compression" refers to Atti compression and is measured according to a known procedure, using an Atti compression test device, wherein a piston is used to compress a ball against a spring. The travel of the piston is fixed and the deflection of the spring is measured. The measurement of the deflection of the spring does not begin with its contact with the ball; rather, there is an offset of approximately the first 1.25 mm (0.05 inches) of the spring's deflection. Very low stiffness cores will not cause the spring to deflect by more than 1.25 mm and therefore have a zero compression measurement. The Atti compression tester is designed to measure objects having a diameter of 42.7 mm (1.68 inches); thus, smaller objects, such as golf ball cores, must be shimmed to a total height of 42.7 mm to obtain an accurate reading. Conversion from Atti compression to Riehle (cores), Riehle (balls), 100 kg deflection, 130-10 kg deflection or effective modulus can be carried out according to the formulas given in J. Dalton.

Golf ball cores of the present invention typically have a coefficient of restitution ("COR") at 125 ft/s of at least 0.75, preferably at least 0.78, and more preferably at least 0.79. COR, as used herein, is determined according to a known procedure wherein a golf ball or golf ball subassembly (e.g., a golf ball core) is fired from an air cannon at a given velocity (125 ft/s for purposes of the present invention). Ballistic light screens are located between the air cannon and the steel plate to measure ball velocity. As the ball travels toward the steel plate, it activates each light screen, and the time at each light screen is measured. This provides an incoming transit time period proportional to the ball's incoming velocity. The ball impacts the steel plate and rebounds though the light screens, which again measure the time period required to transit between the light screens. This provides an outgoing transit time period proportional to the ball's outgoing velocity. COR is then calculated as the ratio of the outgoing transit time period to the incoming transit time period, $COR=T_{out}/T_{in}$.

Cores of the present invention are enclosed with a cover, which may be a single-, dual-, or multi-layer cover.

In a particular embodiment, the cover is a dual-layer cover comprising an inner cover layer and an outer cover layer. In a particular aspect of this embodiment, the surface hardness of the outer core layer is greater than the material hardness of the inner cover layer. In another particular aspect of this embodiment, the surface hardness of the outer core layer is greater than both the inner cover layer and the outer cover layer.

The inner cover layer preferably has a material hardness of 95 Shore C or less, or less than 95 Shore C, or 92 Shore C or less, or 90 Shore C or less, or has a material hardness within a range having a lower limit of 70 or 75 or 80 or 84 or 85 Shore C and an upper limit of 90 or 92 or 95 Shore C. The thickness of the inner cover layer is preferably within a range having a lower limit of 0.010 or 0.015 or 0.020 or 0.030 inches and an upper limit of 0.035 or 0.045 or 0.080 or 0.120 inches.

The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches.

Suitable cover layer materials for the golf balls disclosed herein include, but are not limited to, ionomer resin and blends thereof (particularly Surlyn® ionomer resin), polyurethanes, polyureas, (meth)acrylic acid, thermoplastic rubber polymers, polyethylene, and synthetic or natural vulcanized rubber, such as balata. Suitable commercially available ionomeric cover materials include, but are not limited to, Surlyn® ionomer resins and DuPont® HPF 1000 and HPF 2000, commercially available from E. I. du Pont de Nemours and Company; and Totek® ionomers, commercially available from ExxonMobil Chemical Company.

Particularly suitable outer cover layer materials include relatively soft polyurethanes and polyureas. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques. Light stable polyureas and polyurethanes are preferred for the outer cover layer material. Additional suitable cover and rubber core materials are disclosed, for example, in U.S. Patent Application Publication No. 2005/0164810, U.S. Pat. No. 5,919,100, and PCT Publications WO00/23519 and WO00/29129, the entire disclosures of which are hereby incorporated herein by reference. In embodiments of the present invention wherein a golf ball having a single layer cover is provided, the cover layer material is preferably selected from polyurethane and polyurea. In embodiments of the present invention wherein a golf ball having a dual cover is provided, the inner cover layer is preferably a high modulus thermoplastic, and the outer cover layer is preferably selected from polyurethane and polyurea.

Suitable cover layer materials also include blends of ionomers with thermoplastic elastomers. Suitable ionomeric cover materials are further disclosed, for example, in U.S. Pat. Nos. 6,653,382, 6,756,436, 6,894,098, 6,919,393, and 6,953,820, the entire disclosures of which are hereby incorporated by reference. Suitable polyurethane cover materials are further disclosed in U.S. Pat. Nos. 5,334,673, 6,506,851, 6,756,436, and 7,105,623, the entire disclosures of which are hereby incorporated herein by reference. Suitable polyurea cover materials are further disclosed in U.S. Pat. Nos. 5,484,870 and 6,835,794, the entire disclosures of which are hereby incorporated herein by reference. Suitable polyurethane-urea hybrids are blends or copolymers comprising urethane or urea segments as disclosed in U.S. Patent Application Publication No. 2007/0117923, the entire disclosure of which is hereby incorporated herein by reference. Additional suitable cover materials are disclosed, for example, in U.S. Patent Application Publication No. 2005/0164810, U.S. Pat. No. 5,919,100, and PCT Publications WO00/23519 and WO00/29129, the entire disclosures of which are hereby incorporated herein by reference.

In a particular embodiment, the cover is a single layer preferably formed from an ionomeric composition. The single layer cover preferably has a surface hardness of 65 Shore D or less, or 60 Shore D or less, or 45 Shore D or less, or 40 Shore D or less, or from 25 Shore D to 40 Shore D, or from 30 Shore D to 40 Shore D and a thickness within a range having a lower limit of 0.010 or 0.015 or 0.020 or 0.025 or 0.030 or 0.055 or 0.060 inches and an upper limit of 0.065 or 0.080 or 0.090 or 0.100 or 0.110 or 0.120 or 0.140 inches. The flexural modulus of the cover, as measured by ASTM D6272-98 Procedure B, is preferably 500 psi or greater, or from 500 psi to 150,000 psi.

In another particular embodiment, the cover is a dual-layer cover consisting of an inner cover layer and an outer cover layer. The inner cover layer is preferably formed from an ionomeric composition, and preferably has a surface hardness within a range having a lower limit of 30 or 40 or 55 or 60 or 65 Shore D and an upper limit of 66 or 68 or 70 or 75 Shore D, and a thickness within a range having a lower limit of 0.010 or 0.015 or 0.020 or 0.030 inches and an upper limit of 0.035 or 0.040 or 0.045 or 0.050 or 0.055 or 0.075 or 0.080 or 0.110 or 0.120 inches. The outer cover layer is preferably formed from a castable or reaction injection moldable polyurethane, polyurea, or copolymer or hybrid of polyurethane/polyurea. Such cover material is preferably thermosetting, but may be thermoplastic, and preferably has a surface hardness within a range having a lower limit of 30 or 40 Shore D and an upper limit of 52 or 58 or 62 or 66 or 72 or 75 Shore D. The outer cover layer preferably has a thickness within a range having a lower limit of 0.010 or 0.015 or 0.025 inches and an upper limit of 0.035 or 0.040 or 0.045 or 0.050 or 0.055 or 0.075 or 0.080 or 0.115 inches. The two-layer cover preferably has an overall thickness within a range having a lower limit of 0.010 or 0.015 or 0.020 or 0.025 or 0.030 or 0.055 or 0.060 inches and an upper limit of 0.065 or 0.075 or 0.080 or 0.090 or 0.100 or 0.110 or 0.120 or 0.140 inches.

The ionomeric composition of the inner cover layer is preferably selected from:
(a) a composition comprising a "high acid ionomer" (i.e., having an acid content of greater than 16 wt %), such as Surlyn 8150®, a copolymer of ethylene and methacrylic acid, having an acid content of 19 wt %, which is 45% neutralized with sodium, commercially available from E. I. du Pont de Nemours and Company;
(b) a composition comprising a high acid ionomer and a maleic anhydride-grafted non-ionomeric polymer (e.g., Fusabond 572D®, a maleic anhydride-grafted, metallocene-catalyzed ethylene-butene copolymer having about 0.9 wt % maleic anhydride grafted onto the copolymer, commercially available from E. I. du Pont de Nemours and Company). A particularly preferred blend of high acid ionomer and maleic anhydride-grafted polymer is a 84 wt %/16 wt % blend of Surlyn 8150® and Fusabond 572D®. Blends of high acid ionomers with maleic anhydride-grafted polymers are further disclosed, for example, in U.S. Pat. Nos. 6,992,135 and 6,677,401, the entire disclosures of which are hereby incorporated herein by reference;

(c) a composition comprising a 50/45/5 blend of Surlyn® 8940/Surlyn® 9650/Nucrel® 960, preferably having a material hardness of from 80 to 85 Shore C;

(d) a composition comprising a 50/25/25 blend of Surlyn® 8940/Surlyn® 9650/Surlyn® 9910, preferably having a material hardness of about 90 Shore C; and (e) a composition comprising a 50/50 blend of Surlyn® 8940/Surlyn® 9650, preferably having a material hardness of about 86 Shore C.

Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid. Surlyn® 8940, Surlyn® 9650, Surlyn® 9910, and Nucrel® 960 are commercially available from E. I. du Pont de Nemours and Company.

Non-limiting examples of preferred inner cover layer materials are shown in the Examples below.

The inner cover layer material may include a flow modifier, such as, but not limited to, Nucrel® acid copolymer resins, and particularly Nucrel® 960. Nucrel® acid copolymer resins are commercially available from E. I. du Pont de Nemours and Company.

The outer cover layer is preferably formed from a composition comprising polyurethane, polyurea, or a copolymer or hybrid of polyurethane/polyurea. The outer cover layer material may be thermoplastic or thermoset.

A moisture vapor barrier layer is optionally employed between the core and the cover. Moisture vapor barrier layers are further disclosed, for example, in U.S. Pat. Nos. 6,632,147, 6,932,720, 7,004,854, and 7,182,702, the entire disclosures of which are hereby incorporated herein by reference.

The present invention is not limited by any particular process for forming the golf ball layer(s). It should be understood that the layer(s) can be formed by any suitable technique, including injection molding, compression molding, casting, and reaction injection molding.

When injection molding is used, the composition is typically in a pelletized or granulated form that can be easily fed into the throat of an injection molding machine wherein it is melted and conveyed via a screw in a heated barrel at temperatures of from 150° F. to 600° F., preferably from 200° F. to 500° F. The molten composition is ultimately injected into a closed mold cavity, which may be cooled, at ambient or at an elevated temperature, but typically the mold is cooled to a temperature of from 50° F. to 70° F. After residing in the closed mold for a time of from 1 second to 300 seconds, preferably from 20 seconds to 120 seconds, the core and/or core plus one or more additional core or cover layers is removed from the mold and either allowed to cool at ambient or reduced temperatures or is placed in a cooling fluid such as water, ice water, dry ice in a solvent, or the like.

When compression molding is used to form a center, the composition is first formed into a preform or slug of material, typically in a cylindrical or roughly spherical shape at a weight slightly greater than the desired weight of the molded core. Prior to this step, the composition may be first extruded or otherwise melted and forced through a die after which it is cut into a cylindrical preform. It is that preform that is then placed into a compression mold cavity and compressed at a mold temperature of from 150° F. to 400° F., preferably from 250° F. to 350° F., and more preferably from 260° F. to 295° F. When compression molding a core or cover layer of an HNP composition, a half-shell is first formed via injection molding and then a core comprising one or more layers is enclosed within two half shells and then compression molded in a similar manner to the process previously described.

Reaction injection molding processes are further disclosed, for example, in U.S. Pat. Nos. 6,083,119, 7,338,391, 7,282,169, 7,281,997 and U.S. Patent Application Publication No. 2006/0247073, the entire disclosures of which are hereby incorporated herein by reference.

Golf balls of the present invention typically have a compression of 120 or less, or a compression within a range having a lower limit of 50 or 60 or 65 or 75 or 80 or 90 and an upper limit of 95 or 100 or 105 or 110 or 115 or 120. Golf balls of the present invention typically have a COR at 125 ft/s of at least 0.75, preferably at least 0.78, and more preferably at least 0.79.

Golf balls of the present invention will typically have dimple coverage of 60% or greater, preferably 65% or greater, and more preferably 75% or greater. The United States Golf Association specifications limit the minimum size of a competition golf ball to 1.680 inches. There is no specification as to the maximum diameter, and golf balls of any size can be used for recreational play. Golf balls of the present invention can have an overall diameter of any size. The preferred diameter of the present golf balls is from 1.680 inches to 1.800 inches. More preferably, the present golf balls have an overall diameter of from 1.680 inches to 1.760 inches, and even more preferably from 1.680 inches to 1.740 inches.

Golf balls of the present invention preferably have a moment of inertia ("MOI") of 70-95 g·cm$^2$, preferably 75-93 g·cm$^2$, and more preferably 76-90 g·cm$^2$. For low MOI embodiments, the golf ball preferably has an MOI of 85 g·cm$^2$ or less, or 83 g·cm$^2$ or less. For high MOI embodiment, the golf ball preferably has an MOI of 86 g·cm$^2$ or greater, or 87 g·cm$^2$ or greater. MOI is measured on a model MOI-005-104 Moment of Inertia Instrument manufactured by Inertia Dynamics of Collinsville, Conn. The instrument is connected to a PC for communication via a COMM port and is driven by MOI Instrument Software version #1.2.

Thermoplastic layers herein may be treated in such a manner as to create a positive or negative hardness gradient. In golf ball layers of the present invention wherein a thermosetting rubber is used, gradient-producing processes and/or gradient-producing rubber formulation may be employed. Gradient-producing processes and formulations are disclosed more fully, for example, in U.S. patent application Ser. Nos. 12/048,665, filed on Mar. 14, 2008; 11/829,461, filed on Jul. 27, 2007; 11/772,903, filed Jul. 3, 2007; 11/832,163, filed Aug. 1, 2007; 11/832,197, filed on Aug. 1, 2007; the entire disclosure of each of these references is hereby incorporated herein by reference.

In addition to the materials disclosed above, any of the core or cover layers may comprise one or more of the following materials: thermoplastic elastomer, thermoset elastomer, synthetic rubber, thermoplastic vulcanizate, copolymeric ionomer, terpolymeric ionomer, polycarbonate, polyolefin, polyamide, copolymeric polyamide, polyesters, polyester-amides, polyether-amides, polyvinyl alcohols, acrylonitrile-butadiene-styrene copolymers, polyarylate, polyacrylate, polyphenylene ether, impact-modified polyphenylene ether, high impact polystyrene, diallyl phthalate polymer, metallocene-catalyzed polymers, styrene-acrylonitrile (SAN), olefin-modified SAN, acrylonitrile-styrene-acrylonitrile, styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene-diene rubber (EPDM), ethylene-vinyl acetate copolymer (EVA), ethylene propylene rubber (EPR), ethylene vinyl acetate, polyurea, and polysiloxane. Suitable polyamides for use as an additional material in compositions disclosed herein also include resins obtained by: (1) polycondensation of (a) a dicarboxylic acid, such as oxalic acid, adipic acid, sebacic acid, terephthalic acid, isophthalic acid or 1,4-cyclohexanedicarboxylic acid, with (b) a diamine, such as ethylenediamine, tetramethylenediamine, pentamethylenediamine, hexamethylenediamine, or decamethylenediamine, 1,4-cyclohexyldiamine or m-xylylenediamine; (2) a ring-opening polymerization of cyclic lactam, such as ε-caprolactam or ω-laurolactam; (3) polycondensation of an aminocarboxylic acid, such as 6-aminocaproic acid, 9-aminononanoic acid, 11-aminoundecanoic acid or 12-aminododecanoic acid; or (4) copolymerzation of a cyclic lactam with a dicarboxylic acid and a diamine. Specific examples of suitable polyamides include Nylon 6, Nylon 66, Nylon 610, Nylon 11, Nylon 12, copolymerized Nylon, Nylon MXD6, and Nylon 46.

In embodiments of the present invention wherein at least one layer is formed from a rubber composition, suitable rubber compositions include natural and synthetic rubbers, including, but not limited to, polybutadiene, polyisoprene, ethylene propylene rubber ("EPR"), ethylene propylene diene rubber ("EPDM"), styrenic block copolymer rubbers (such as SI, SIS, SB, SBS, SIBS, and the like, where "S" is styrene, "I" is isobutylene, and "B" is butadiene), butyl rubber, halobutyl rubber, copolymers of isobutylene and para-alkylstyrene, halogenated copolymers of isobutylene and para-alkylstyrene, copolymers of butadiene with acrylonitrile, polychloroprene, alkyl acrylate rubber, chlorinated isoprene rubber, acrylonitrile chlorinated isoprene rubber, and combinations of two or more thereof. Diene rubbers are preferred, particularly polybutadienes and mixtures of polybutadiene with other elastomers, and especially 1,4-polybutadiene having a cis-structure of at least 40%. In a particularly preferred embodiment, the rubber composition is a reaction product of a diene rubber, a crosslinking agent, a filler, a co-crosslinking agent or free radical initiator, and optionally a cis-to-trans catalyst. The rubber is preferably selected from polybutadiene and styrene-butadiene. The crosslinking agent typically includes a metal salt, such as a zinc-, aluminum-, sodium-, lithium-, nickel-, calcium-, or magnesium salt, of an unsaturated fatty acid or monocarboxylic acid, such as (meth)acrylic acid. Preferred crosslinking agents include zinc acrylate, zinc diacrylate (ZDA), zinc methacrylate, and zinc dimethacrylate (ZDMA), and mixtures thereof. The crosslinking agent is present in an amount sufficient to crosslink a portion of the chains of the polymers in the composition. The crosslinking agent is generally present in the rubber composition in an amount of from 15 to 30 phr, or from 19 to 25 phr, or from 20 to 24 phr. The desired compression may be obtained by adjusting the amount of crosslinking, which can be achieved, for example, by altering the type and amount of crosslinking agent. The free radical initiator can be any known polymerization initiator which decomposes during the cure cycle, including, but not limited to, dicumyl peroxide, 1,1-di-(t-butylperoxy) 3,3,5-trimethyl cyclohexane, a-a bis-(t-butylperoxy)diisopropylbenzene, 2,5-dimethyl-2,5 di-(t-butylperoxy)hexane or di-t-butyl peroxide, and mixtures thereof. The rubber composition optionally contains one or more antioxidants. Antioxidants are compounds that can inhibit or prevent the oxidative degradation of the rubber. Suitable antioxidants include, for example, dihydroquinoline antioxidants, amine type antioxidants, and phenolic type antioxidants. The rubber composition may also contain one or more fillers to adjust the density and/or specific gravity of the core or cover. Fillers are typically polymeric or mineral particles. Exemplary fillers include precipitated hydrated silica, clay, talc, asbestos, glass fibers, aramid fibers, mica, calcium metasilicate, barium sulfate, zinc sulfide, lithopone, silicates, silicon carbide, diatomaceous earth, polyvinyl chloride, carbonates (e.g., calcium carbonate and magnesium carbonate), metals (e.g., titanium, tungsten, aluminum, bismuth, nickel, molybdenum, iron, lead, copper, boron, cobalt, beryllium, zinc, and tin), metal alloys (e.g., steel, brass, bronze, boron carbide whiskers, and tungsten carbide whiskers), metal oxides (e.g., zinc oxide, iron oxide, aluminum oxide, titanium oxide, magnesium oxide, and zirconium oxide), particulate carbonaceous materials (e.g., graphite, carbon black, cotton flock, natural bitumen, cellulose flock, and leather fiber), microballoons (e.g., glass and ceramic), fly ash, regrind, nanofillers and combinations thereof. The rubber composition may also contain one or more additives selected from free radical scavengers, accelerators, scorch retarders, coloring agents, fluorescent agents, chemical blowing and foaming agents, defoaming agents, stabilizers, softening agents, impact modifiers, plasticizers, and the like. The rubber composition may also contain a soft and fast agent, such as those disclosed in U.S. patent application Ser. No. 11/972,240, the entire disclosure of which is hereby incorporated herein by reference. Examples of commercially available polybutadienes suitable for use in forming golf ball core layers of the present invention include, but are not limited to, Buna CB23, commercially available from LANXESS Corporation; SE BR-1220, commercially available from The Dow Chemical Company; Europrene® NEOCIS® BR 40 and BR 60, commercially available from Polimeri Europa; UBEPOL-BR® rubbers, commercially available from UBE Industries, Ltd.; and BR 01 commercially available from Japan Synthetic Rubber Co., Ltd. Suitable types and amounts of rubber, crosslinking agent, filler, co-crosslinking agent, initiator and additives are more fully described in, for example, U.S. Patent Application Publication No. 2004/0214661, 2003/0144087, and 2003/0225197, and U.S. Pat. Nos. 6,566,483, 6,695,718, and 6,939,907, the entire disclosures of which are hereby incorporated herein by reference.

In embodiments of the present invention wherein at least one layer is formed from a conventional HNP composition, suitable HNP compositions comprise an HNP and optionally additives, fillers, and/or melt flow modifiers. Suitable HNPs are salts of homopolymers and copolymers of α,β-ethylenically unsaturated mono- or dicarboxylic acids, and combinations thereof, optionally including a softening monomer. The acid polymer is neutralized to 70% or higher, including up to 100%, with a suitable cation source. Suitable additives and fillers include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants; inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate, and the like; high specific gravity metal powder fillers, such as tungsten powder, molybdenum powder, and the like; regrind, i.e., core material that is ground and recycled; and nano-fillers. Suitable melt flow modifiers include, for example, fatty acids and salts thereof, polyamides, polyesters, polyacrylates, polyurethanes, polyethers, polyureas, polyhydric alcohols, and combinations thereof. Suitable HNP compositions also include blends of HNPs with partially neutralized ionomers as disclosed, for example, in U.S. Patent Application Publication No. 2006/0128904, the entire disclosure of which is hereby incorporated herein by reference, and blends of HNPs with additional thermoplastic and thermoset materials, including, but not limited to, ionomers, acid copolymers, engineering thermoplastics, fatty acid/salt-based highly neutralized polymers, polybutadienes, polyurethanes, polyesters, thermoplastic elastomers, and other conventional polymeric materials. Suitable HNP compositions are further disclosed, for example, in U.S. Pat. Nos. 6,653,382, 6,756,436, 6,777,472, 6,894,098, 6,919,393, and 6,953,820, the entire disclosures of which are hereby incorporated herein by reference.

Other preferred materials suitable for use as an additional material in golf ball compositions disclosed herein include Skypel polyester elastomers, commercially available from SK Chemicals of South Korea; Septon® diblock and triblock copolymers, commercially available from Kuraray Corporation of Kurashiki, Japan; and Kraton® diblock and triblock copolymers, commercially available from Kraton® Polymers LLC of Houston, Tex.

Ionomers are also well suited for blending with compositions disclosed herein. Suitable ionomeric polymers include α-olefin/unsaturated carboxylic acid copolymer- or terpolymer-type ionomeric resins. Copolymeric ionomers are obtained by neutralizing at least a portion of the carboxylic groups in a copolymer of an α-olefin and an α,β-unsaturated carboxylic acid having from 3 to 8 carbon atoms, with a metal ion. Terpolymeric ionomers are obtained by neutralizing at least a portion of the carboxylic groups in a terpolymer of an α-olefin, an α,β-unsaturated carboxylic acid having from 3 to 8 carbon atoms, and an α,β-unsaturated carboxylate having from 2 to 22 carbon atoms, with a metal ion. Examples of suitable α-olefins for copolymeric and terpolymeric ionomers include ethylene, propylene, 1-butene, and 1-hexene. Examples of suitable unsaturated carboxylic acids for copolymeric and terpolymeric ionomers include acrylic, methacrylic, ethacrylic, α-chloroacrylic, crotonic, maleic, fumaric, and itaconic acid. Copolymeric and terpolymeric ionomers include ionomers having varied acid contents and degrees of acid neutralization, neutralized by monovalent or bivalent cations as disclosed herein. Examples of commercially available ionomers suitable for blending with compositions disclosed herein include Surlyn® ionomer resins, commercially available from E. I. du Pont de Nemours and Company, and Iotek® ionomers, commercially available from ExxonMobil Chemical Company.

Silicone materials are also well suited for blending with compositions disclosed herein. Suitable silicone materials include monomers, oligomers, prepolymers, and polymers, with or without adding reinforcing filler. One type of silicone material that is suitable can incorporate at least 1 alkenyl group having at least 2 carbon atoms in their molecules. Examples of these alkenyl groups include, but are not limited to, vinyl, allyl, butenyl, pentenyl, hexenyl, and decenyl. The alkenyl functionality can be located at any location of the silicone structure, including one or both terminals of the structure. The remaining (i.e., non-alkenyl) silicon-bonded organic groups in this component are independently selected from hydrocarbon or halogenated hydrocarbon groups that contain no aliphatic unsaturation. Non-limiting examples of these include: alkyl groups, such as methyl, ethyl, propyl, butyl, pentyl, and hexyl; cycloalkyl groups, such as cyclohexyl and cycloheptyl; aryl groups, such as phenyl, tolyl, and xylyl; aralkyl groups, such as benzyl and phenethyl; and halogenated alkyl groups, such as 3,3,3-trifluoropropyl and chloromethyl. Another type of suitable silicone material is one having hydrocarbon groups that lack aliphatic unsaturation. Specific examples include: trimethylsiloxy-endblocked dimethylsiloxane-methylhexenylsiloxane copolymers; dimethylhexenylsiloxy-endblocked dimethylsiloxane-methylhexenylsiloxane copolymers; trimethylsiloxy-endblocked dimethylsiloxane-methylvinylsiloxane copolymers; trimethylsiloxy-endblocked methylphenylsiloxane-dimethylsiloxane-methylvinylsiloxane copolymers; dimethylvinylsiloxy-endblocked dimethylpolysiloxanes; dimethylvinylsiloxy-endblocked dimethylsiloxane-methylvinylsiloxane copolymers; dimethylvinylsiloxy-endblocked methylphenylpolysiloxanes; dimethylvinylsiloxy-endblocked methylphenylsiloxane-dimethylsiloxane-methylvinylsiloxane copolymers; and the copolymers listed above wherein at least one group is dimethylhydroxysiloxy. Examples of commercially available silicones suitable for blending with compositions disclosed herein include Silastic® silicone rubber, commercially available from Dow Corning Corporation of Midland, Mich.; Blensil® silicone rubber, commercially available from General Electric Company of Waterford, N.Y.; and Elastosil® silicones, commercially available from Wacker Chemie AG of Germany.

Other types of copolymers can also be added to the golf ball compositions disclosed herein. For example, suitable copolymers comprising epoxy monomers include styrene-butadiene-styrene block copolymers in which the polybutadiene block contains an epoxy group, and styrene-isoprene-styrene block copolymers in which the polyisoprene block contains epoxy. Examples of commercially available epoxy functionalized copolymers include ESBS A1005, ESBS A1010, ESBS A1020, ESBS AT018, and ESBS AT019 epoxidized styrene-butadiene-styrene block copolymers, commercially available from Daicel Chemical Industries, Ltd. of Japan.

Ionomeric compositions used to form golf ball layers of the present invention can be blended with non-ionic thermoplastic resins, particularly to manipulate product properties. Examples of suitable non-ionic thermoplastic resins include, but are not limited to, polyurethane, poly-ether-ester, polyamide-ether, polyether-urea, Pebax® thermoplastic polyether block amides commercially available from Arkema Inc., styrene-butadiene-styrene block copolymers, styrene (ethylene-butylene)-styrene block copolymers, polyamides, polyesters, polyolefins (e.g., polyethylene, polypropylene, ethylene-propylene copolymers, ethylene-(meth)acrylate, ethylene-(meth)acrylic acid, functionalized polymers with maleic anhydride grafting, epoxidation, etc., elastomers (e.g., EPDM, metallocene-catalyzed polyethylene) and ground powders of the thermoset elastomers.

Also suitable for forming the center and outer core layers are the compositions having high COR when formed into solid spheres disclosed in U.S. Patent Application Publication No. 2003/0130434 and U.S. Pat. No. 6,653,382, the entire disclosures of which are hereby incorporated herein by reference. Reference is also made to U.S. Patent Application Publication No. 2003/0144087 for various ball constructions and materials that can be used in golf ball core, intermediate, and cover layers.

Additional materials suitable for forming the core layers include the core compositions disclosed in U.S. Pat. No. 7,300,364, the entire disclosure of which is hereby incorporated herein by reference. For example, suitable center and outer core materials include HNPs neutralized with organic fatty acids and salts thereof, metal cations, or a combination of both. In addition to HNPs neutralized with organic fatty acids and salts thereof, core compositions may comprise at least one rubber material having a resilience index of at least about 40. Preferably the resilience index is at least about 50. Polymers that produce resilient golf balls and, therefore, are suitable for the present invention, include but are not limited to CB23, CB22, commercially available from of Bayer Corp. of Orange, Tex., BR60, commercially available from Enichem of Italy, and 1207G, commercially available from Goodyear Corp. of Akron, Ohio. Additionally, the unvulcanized rubber, such as polybutadiene, in golf balls prepared according to the invention typically has a Mooney viscosity of between about 40 and about 80, more preferably, between about 45 and about 65, and most preferably, between about 45 and about 55. Mooney viscosity is typically measured according to ASTM-D 1646.

In addition to the above materials, the center can be formed from a low deformation material selected from metal, rigid plastics, polymers reinforced with high strength organic or inorganic fillers or fibers, and blends and composites thereof. Suitable low deformation materials also include those disclosed in U.S. Patent Application Publication No. 2005/0250600, the entire disclosure of which is hereby incorporated herein by reference.

EXAMPLES

It should be understood that the examples below are for illustrative purposes only. In no manner is the present invention limited to the specific disclosures herein.

Additional Examples of Suitable HNPs

The HNPs of Table 1 below have been found to be particularly useful as the relatively soft HNP and/or the relatively hard HNP of the present invention.

TABLE 1

| Example | cation source | Flexural Modulus*, psi | Hardness**, Shore C (18 day) | Hardness**, Shore D (annealed) |
|---|---|---|---|---|
| 1 | Ca/Mg | 71,600 | 88 | 57 |
| 2 | Ca/Li | 70,300 | 89 | 58 |
| 3 | Ca | 70,100 | 92 | 60 |
| 4 | Ca/Zn | 60,400 | 88 | 58 |
| 5 | Mg | 38,300 | 84 | 52 |
| 6 | Mg | 27,600 | 84 | 52 |
| 7 | Mg | 16,300 | 78 | 45 |
| 8 | Mg | 10,600 | 70 | 40 |
| 9 | Mg | 10,400 | 69 | 39 |

*Flexural modulus was measured according to ASTM D790-03 Procedure B.
**Hardness was measured according to ASTM D2240.

In embodiments of the present invention directed to a golf ball having center formed from a relatively soft HNP composition, Examples 6-9 are particularly suitable for use as the relatively soft HNP composition.

In embodiments of the present invention directed to a golf ball having an outer core layer formed from a relatively soft HNP composition, Examples 5-9 are particularly suitable for use as the relatively soft HNP composition.

In embodiments of the present invention directed to a golf ball having a center formed from a relatively hard HNP composition, Examples 1-6 are particularly suitable for use as the relatively hard HNP composition.

In embodiments of the present invention directed to a golf ball having an outer core layer formed from a relatively hard HNP composition, Examples 1-4 are particularly suitable for use as the relatively hard HNP composition.

Additional Examples of Suitable Ionomeric Cover Layer Compositions

Twelve ionomeric inner cover layer compositions according to the present invention were prepared by melt blending Surlyn® 8150 and Fusabond® 572D in a twin screw extruder, at a temperature of at least 450° F. (230° C.). The relative amounts of each component used are indicated in Table 2 below.

Flex bars of each blend composition were formed and evaluated for hardness according to ASTM D2240 following 10 days of aging at 50% relative humidity and 23° C. The results are reported in Table 2 below.

TABLE 2

| Example | Surlyn ® 8150, wt % | Fusabond ® 572D, wt % | Shore C Hardness at 10 Days |
|---|---|---|---|
| 1 | 89 | 11 | 91.2 |
| 2 | 84 | 16 | 89.8 |
| 3 | 84 | 16 | 90.4 |
| 4 | 84 | 16 | 89.6 |
| 5 | 81 | 19 | 88.9 |
| 6 | 80 | 20 | 89.1 |
| 7 | 78 | 22 | 88.1 |
| 8 | 76 | 24 | 87.6 |
| 9 | 76 | 24 | 87.2 |
| 10 | 73 | 27 | 86.6 |
| 11 | 71 | 29 | 86.7 |
| 12 | 67 | 33 | 84.0 |

When numerical lower limits and numerical upper limits are set forth herein, it is contemplated that any combination of these values may be used.

All patents, publications, test procedures, and other references cited herein, including priority documents, are fully incorporated by reference to the extent such disclosure is not inconsistent with this invention and for all jurisdictions in which such incorporation is permitted.

While the illustrative embodiments of the invention have been described with particularity, it will be understood that various other modifications will be apparent to and can be readily made by those of ordinary skill in the art without departing from the spirit and scope of the invention. Accordingly, it is not intended that the scope of the claims appended hereto be limited to the examples and descriptions set forth herein, but rather that the claims be construed as encompassing all of the features of patentable novelty which reside in the present invention, including all features which would be treated as equivalents thereof by those of ordinary skill in the art to which the invention pertains.

What is claimed is:
1. A golf ball consisting of:
(a) a center having a diameter of from 1.20 inches to 1.30 inches, a center hardness of 50 Shore C or greater, and formed from a first HNP composition, the first HNP composition having a material hardness of 55 Shore D or less and comprising a highly neutralized ethylene/(meth)acrylic acid/alkyl (meth)acrylate copolymer;
(b) an outer core layer having a surface hardness of 75 Shore C or greater and formed from a second HNP composition, the second HNP composition having a material hardness of 45 Shore D or greater and comprising a highly neutralized ethylene/(meth)acrylic acid copolymer;

(c) an inner cover layer formed from a thermoplastic composition and having a material hardness less than the surface hardness of the outer core layer; and (d) an outer cover layer formed from a polyurethane or polyurea composition;

wherein the material hardness of the first HNP composition is less than the material hardness of the second HNP composition.

2. The golf ball of claim 1, wherein the surface hardness of the outer core layer is at least 20 Shore C units greater than the center hardness.

3. The golf ball of claim 1, wherein the outer cover layer has a material hardness less than the surface hardness of the outer core layer.

4. The golf ball of claim 1, wherein the center has a center hardness of from 55 Shore C to 70 Shore C.

5. The golf ball of claim 1, wherein the surface hardness of the outer core layer is 85 Shore C or greater, and the inner cover layer has a material hardness of 90 Shore C or less.

6. The golf ball of claim 1, wherein the surface hardness of the outer core layer is 90 Shore C or greater, and the inner cover layer has a material hardness of 90 Shore C or less.

7. The golf ball of claim 1, wherein the core has an overall dual core compression of from 75 to 90.

8. The golf ball of claim 1, wherein the core has an overall dual core diameter of from 1.52 inches to 1.59 inches.

9. A golf ball consisting of:

(a) a center having a diameter of from 0.75 inches to 1.19 inches, a center hardness of 50 Shore C or greater, and formed from a first HNP composition, the first HNP composition having a material hardness of 55 Shore D or less and comprising a highly neutralized ethylene/(meth)acrylic acid/alkyl (meth)acrylate copolymer;

(b) an outer core layer having a surface hardness of 75 Shore C or greater and formed from a second HNP composition, the second HNP composition having a material hardness of 45 Shore D or greater and comprising a highly neutralized ethylene/(meth)acrylic acid copolymer;

(c) an inner cover layer formed from a thermoplastic composition and having a material hardness less than the surface hardness of the outer core layer; and (d) an outer cover layer formed from a polyurethane or polyurea composition, wherein the material hardness of the first HNP composition is less than the material hardness of the second HNP composition.

10. The golf ball of claim 9, wherein the surface hardness of the outer core layer is at least 20 Shore C units greater than the center hardness.

11. The golf ball of claim 9, wherein the outer cover layer has a material hardness less than the surface hardness of the outer core layer.

12. The golf ball of claim 9, wherein the center has a center hardness of from 55 Shore C to 70 Shore C.

13. The golf ball of claim 9, wherein the surface hardness of the outer core layer is 85 Shore C or greater, and the inner cover layer has a material hardness of 90 Shore C or less.

14. The golf ball of claim 9, wherein the surface hardness of the outer core layer is 90 Shore C or greater, and the inner cover layer has a material hardness of 90 Shore C or less.

15. The golf ball of claim 9, wherein the core has an overall dual core compression of from 75 to 90.

16. The golf ball of claim 9, wherein the diameter of the center is from 0.850 inches to 1.150 inches.

17. The golf ball of claim 9, wherein the diameter of the center is from 0.875 inches to 1.125 inches.

18. The golf ball of claim 9, wherein the core has an overall dual core diameter of from 1.52 inches to 1.59 inches.

* * * * *